(12) United States Patent
Okinaga et al.

(10) Patent No.: US 9,975,493 B2
(45) Date of Patent: May 22, 2018

(54) VEHICULAR CONSOLE DEVICE

(71) Applicant: Honda Motor Co., Ltd., Tokyo (JP)

(72) Inventors: Toru Okinaga, Wako (JP); Katsuhiko Imai, Wako (JP); Shoji Nakauchi, Wako (JP); Takafumi Kaibara, Wako (JP); Satoru Konishi, Wako (JP); Tomohiko Uematsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/454,059

(22) Filed: Mar. 9, 2017

(65) Prior Publication Data
US 2017/0259749 A1 Sep. 14, 2017

(30) Foreign Application Priority Data
Mar. 9, 2016 (JP) ................................. 2016-045269

(51) Int. Cl.
*B60R 7/08* (2006.01)
*B60R 7/04* (2006.01)
(52) U.S. Cl.
CPC . *B60R 7/08* (2013.01); *B60R 7/04* (2013.01)
(58) Field of Classification Search
CPC .................................... B60R 7/08; B60R 7/04
USPC ............................................. 296/24.34, 37.8
See application file for complete search history.

(56) References Cited

U.S. PATENT DOCUMENTS

| 7,258,381 | B2 * | 8/2007 | Sturt ........................ | B60R 7/04 296/24.34 |
| 7,513,553 | B2 * | 4/2009 | Singh ...................... | B60N 3/08 296/37.8 |
| 8,100,454 | B2 * | 1/2012 | D'Alessandro .......... | B60R 7/04 296/37.8 |
| 8,714,613 | B1 * | 5/2014 | Gillis ....................... | B60R 7/04 296/24.34 |
| 9,561,753 | B1 * | 2/2017 | Mendoza Vera ......... | B60R 7/04 |
| 2009/0174236 | A1 * | 7/2009 | Lota ..................... | B60N 2/4606 297/188.19 |
| 2015/0035308 | A1 * | 2/2015 | Huebner .................. | B60R 7/04 296/37.8 |
| 2017/0088060 | A1 * | 3/2017 | Buza ....................... | B60R 7/04 |

FOREIGN PATENT DOCUMENTS

| JP | 2004-203065 A | 7/2004 |
| JP | 2008-189170 A | 8/2008 |

OTHER PUBLICATIONS

Office Action dated Nov. 21, 2017, issued in counterpart Japanese Application No. 2016-045269, with English machine translation. (6 pages).

* cited by examiner

*Primary Examiner* — Pinel E Romain
(74) *Attorney, Agent, or Firm* — Westerman, Hattori, Daniels & Adrian, LLP

(57) ABSTRACT

A vehicular console device includes a console outer casing disposed in the interior of a vehicle, a console box disposed in the console outer casing, and a tray supported in the console box. The tray includes a tray body and a tray vertical wall. The tray body is supported in the console box to be movable in a longitudinal direction of the vehicle. The tray vertical wall is formed to extend upward from a tray rear wall of the tray body.

6 Claims, 16 Drawing Sheets

VEHICULAR CONSOLE DEVICE

CROSS REFERENCES TO RELATED APPLICATIONS

The present application claims priority under 35 U.S.C. § 119 to Japanese Patent Application No. 2016-045269, filed Mar. 9, 2016, entitled "Vehicular Console Device." The contents of this application are incorporated herein by reference in their entirety.

BACKGROUND

1. Field

The present disclosure relates to a vehicular console device including a console box disposed in a vehicle interior and a tray disposed in the console box.

2. Description of the Related Art

In one example of vehicular console devices, a tray is supported on a slide rail within a console box to be movable in a longitudinal direction of a vehicle, and a peripheral wall is formed around the tray. With that type of vehicular console device, a storage space is formed in the console box, and the tray is arranged above the storage space. Accordingly, a comparatively tall article is stored in the storage space, and small articles are placed on the tray (see, e.g., Japanese Unexamined Patent Application Publication No. 2008-189170).

In the vehicular console device disclosed in Japanese Unexamined Patent Application Publication No. 2008-189170, however, the peripheral wall of the tray is formed in a comparatively low height. There is hence a possibility that the small articles placed on the tray may drop into the storage space. Furthermore, there is a possibility that the comparatively tall article, such as a plastic bottle, placed in the storage space may tip over.

In addition, articles placed in the storage space are easily seen from the outside of the vehicular console device. Thus, a room for improvement still remains from the viewpoint of security.

SUMMARY

The present application describes a vehicular console device that can suppress dropping of small articles placed on a tray, that can store a tall article in a stable state, and that can make the interior of a console box harder to be seen from the outside.

According to a first aspect of the present application, there is provided a vehicular console device including a console box disposed in a vehicle interior and a tray supported in the console box, wherein the tray includes a tray body supported in the console box to be movable in a longitudinal (front-to-rear) direction of a vehicle, and a tray vertical wall extending upward from a rear portion of the tray body in the longitudinal direction of the vehicle.

Thus, the tray body is supported in the console box, and the tray vertical wall is formed to extend upward from the rear portion of the tray body. With the presence of the tray vertical wall, therefore, small articles placed on the tray body can be avoided from moving to the outside. As a result, a possibility that the small articles placed on the tray body may drop into the interior of the console box can be reduced.

Furthermore, since the tray vertical wall is formed to extend upward from the rear portion of the tray body, a tall article stored in the console box can be held in contact with the tray vertical wall. As a result, the tall article can be stored in the console box in a stable state.

Moreover, since the tray vertical wall is formed to extend upward from the rear portion of the tray rear wall, articles stored in the console box can be concealed from the outside with the presence of the tray vertical wall. As a result, the articles stored in the console box can be made harder to be seen from the outside, and this point is preferable from the viewpoint of security.

According to a second aspect of the present application, preferably, the tray can be supported in a usable state as a tray on the console box, while it is removable (manually detachable) from the console box, and then, the tray can be housed in the console box, i.e., optionally held in a stowed (housed) state in which the tray body is positioned to extend along a console rear wall of the console box and the tray vertical wall is positioned to extend along a console bottom portion of the console box.

Thus, the tray can be optionally held in the state in which a tray bottom portion is positioned to extend along the console rear wall of the console box and the tray vertical wall is positioned to extend along the console bottom portion of the console box. In this case, the interior of the console box is not partitioned by the tray. Accordingly, the console box can be used in such a state that a large space is formed inside the console box.

According to a third aspect of the present application, preferably, an upper half portion of the console rear wall of the console box, the upper half portion opposing to the tray vertical wall, is inclined at an upgrade toward a rear side of the vehicle.

Thus, the upper half portion of the console rear wall of the console box, the upper half portion opposing to the tray vertical wall, is inclined at an upgrade toward the rear side of the vehicle. Therefore, when the tray is removed from the console box, the tray vertical wall can be inclined along the upper half portion of the console rear wall.

As a result, the tray body can be lifted upward from the console box, and the tray can be easily removed from the console box.

According to a fourth aspect of the present application, preferably, the tray includes a first biasing member that is disposed in a rear portion of the tray body, and that is abutted against the console rear wall when the tray is moved up to a rear end of the console box.

Thus, the first biasing member is disposed in the rear portion of the tray body. The first biasing member is abutted against the console rear wall when the tray is moved up to the rear end of the console box. Therefore, in a state where the tray is arranged at the rear end of the console box, "wobbling" of the tray can be suppressed, whereby the occurrence of unusual sounds and vibrations can be suppressed.

Moreover, when the tray is arranged in a stowed state, the first biasing member can be abutted against the console bottom portion. As a result, "wobbling" of the tray arranged in the stowed state can be suppressed, whereby the occurrence of unusual sounds and vibrations can be suppressed.

According to a fifth aspect of the present application, preferably, the tray includes a second biasing member that is disposed in a lateral (side) portion of the tray body, and that biases the console box, and a rib disposed under the second biasing member.

Thus, the second biasing member is disposed in the lateral portion of the tray body such that the second biasing member biases the console box. As a result, "wobbling" of the tray arranged in the usable state can be suppressed, whereby the occurrence of unusual sounds and vibrations can be suppressed.

Furthermore, a rib is disposed under the second biasing member. Accordingly, even when a heavy article is placed on the tray body, the tray can be prevented from disengaging and dropping into the console box with the presence of the rib.

DESCRIPTION OF THE PREFERRED EMBODIMENT

An embodiment of the present application will be described below with reference to the accompanying drawings. It is to be noted that "front (Fr)", "rear (Rr", "left (L)", and "right (R)" represent respective directions looking from a driver.

(Embodiment)

A vehicular console device 20 according to the embodiment is described. In the following description, the vehicular console device 20 is simply called the "console device 20".

Figure 1:
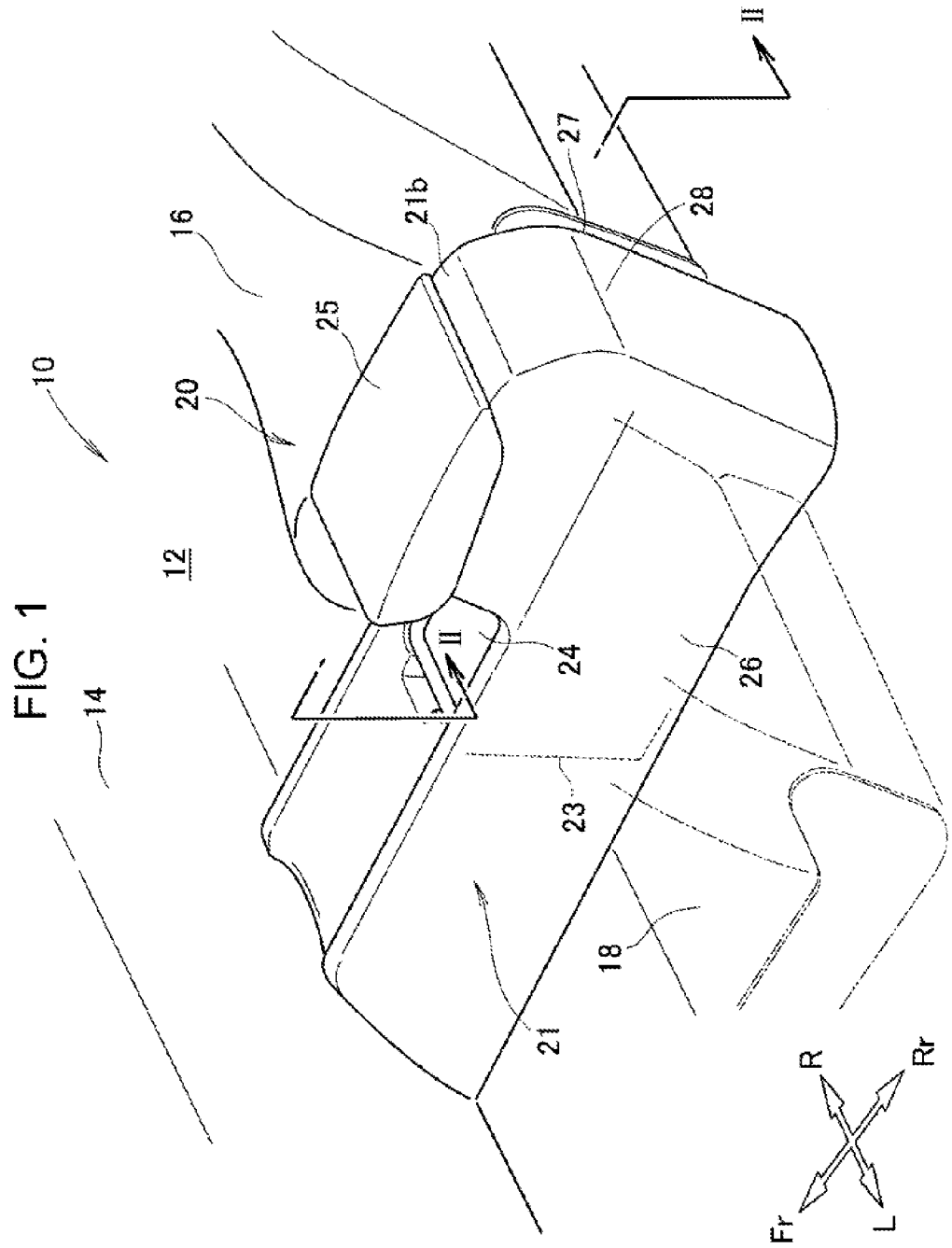
FIG. 1 is a perspective view of a vehicle including a vehicular console device according to the present application.

As illustrated in FIG. 1, a vehicle 10 includes an instrument panel 14 disposed in a front portion of a vehicle interior 12, a driver seat 16 disposed on the rear right side of the instrument panel 14, a front passenger seat 18 disposed on the rear left side of the instrument panel 14, and the console device 20 disposed between the driver seat 16 and the front passenger seat 18.

The console device 20 includes a console outer casing 21 disposed in the vehicle interior 12 between the driver seat 16 and the front passenger seat 18, a console box 23 (see FIG. 2 as well) set within the console outer casing 21, a tray 24 mounted in an upper portion of the console box 23, and an armrest 25 disposed on an upper rear portion 21b of the console outer casing 21.

The console outer casing 21 has a left wall 26, a right wall 27, and a rear wall 28. The console outer casing 21 is defined in the form of a substantially rectangular box by the left wall 26, the right wall 27, and the rear wall 28.

Figure 2:
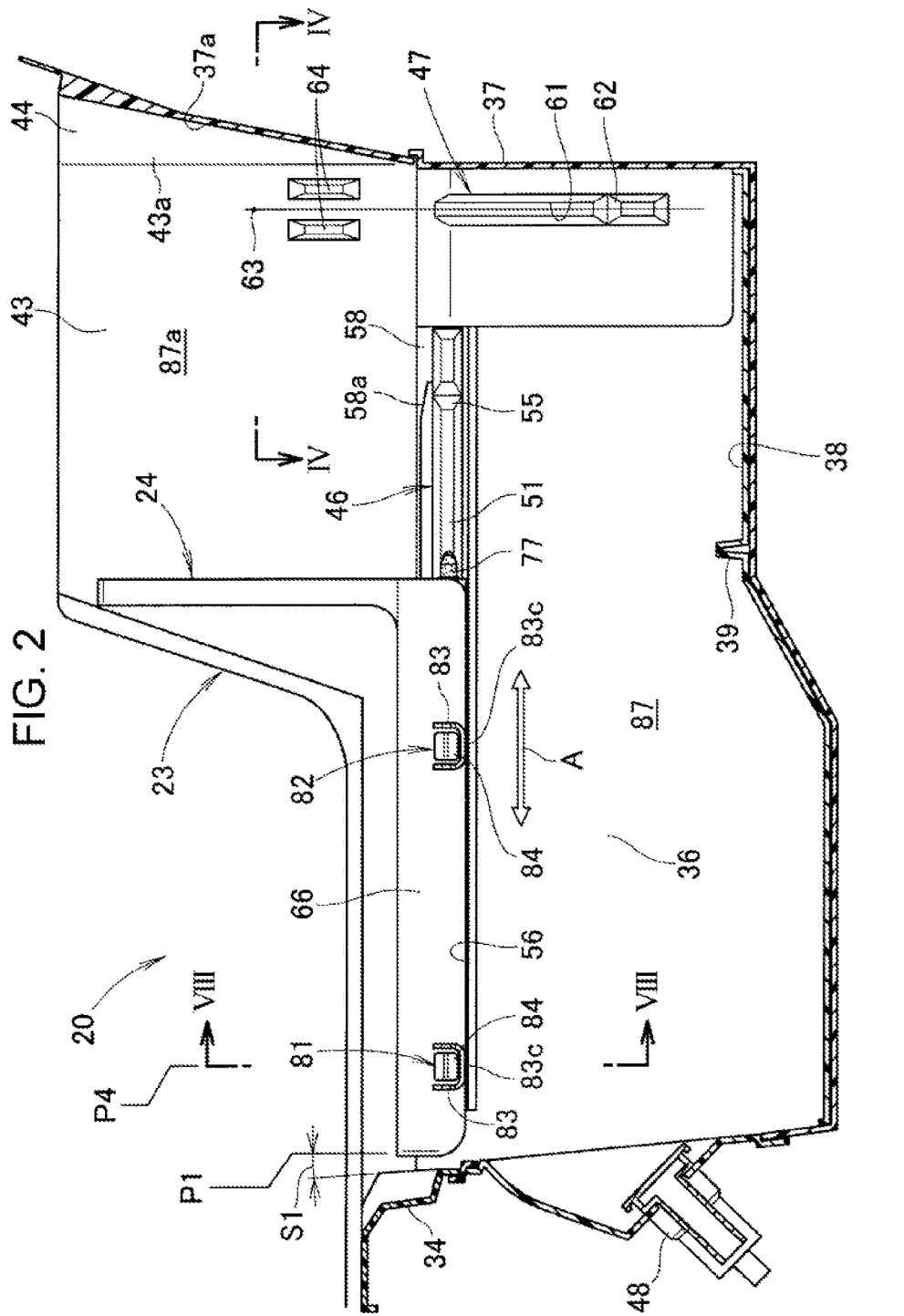
FIG. 2 is a sectional view taken along a line II-II in FIG. 1.
Figure 3:
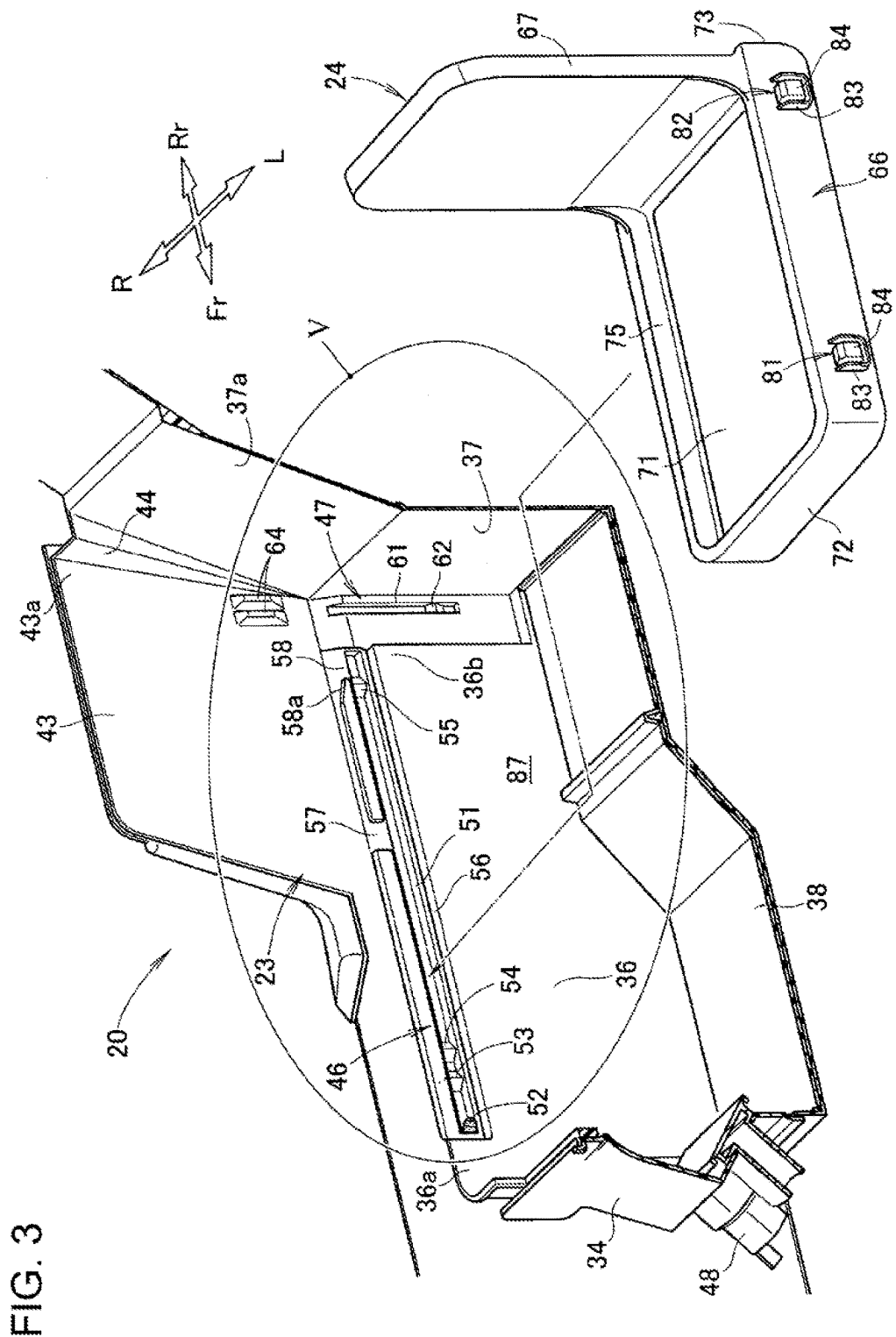
FIG. 3 is an exploded perspective view of a console box and a tray illustrated in FIG. 2.

As illustrated in FIGS. 2 and 3, the console box 23 has a console left wall 35 (see FIG. 4), a console right wall 36, a console rear wall 37, a console front wall 34, and a console bottom portion 38. The console box 23 is defined in the form of a substantially rectangular box by the console left wall 35, the console right wall 36, the console rear wall 37, and the console bottom portion 38.

A protrusion 39 is formed on the console bottom portion 38. An accessory power supply (ACC) 48 is mounted to the console front wall 34.

Figure 4:
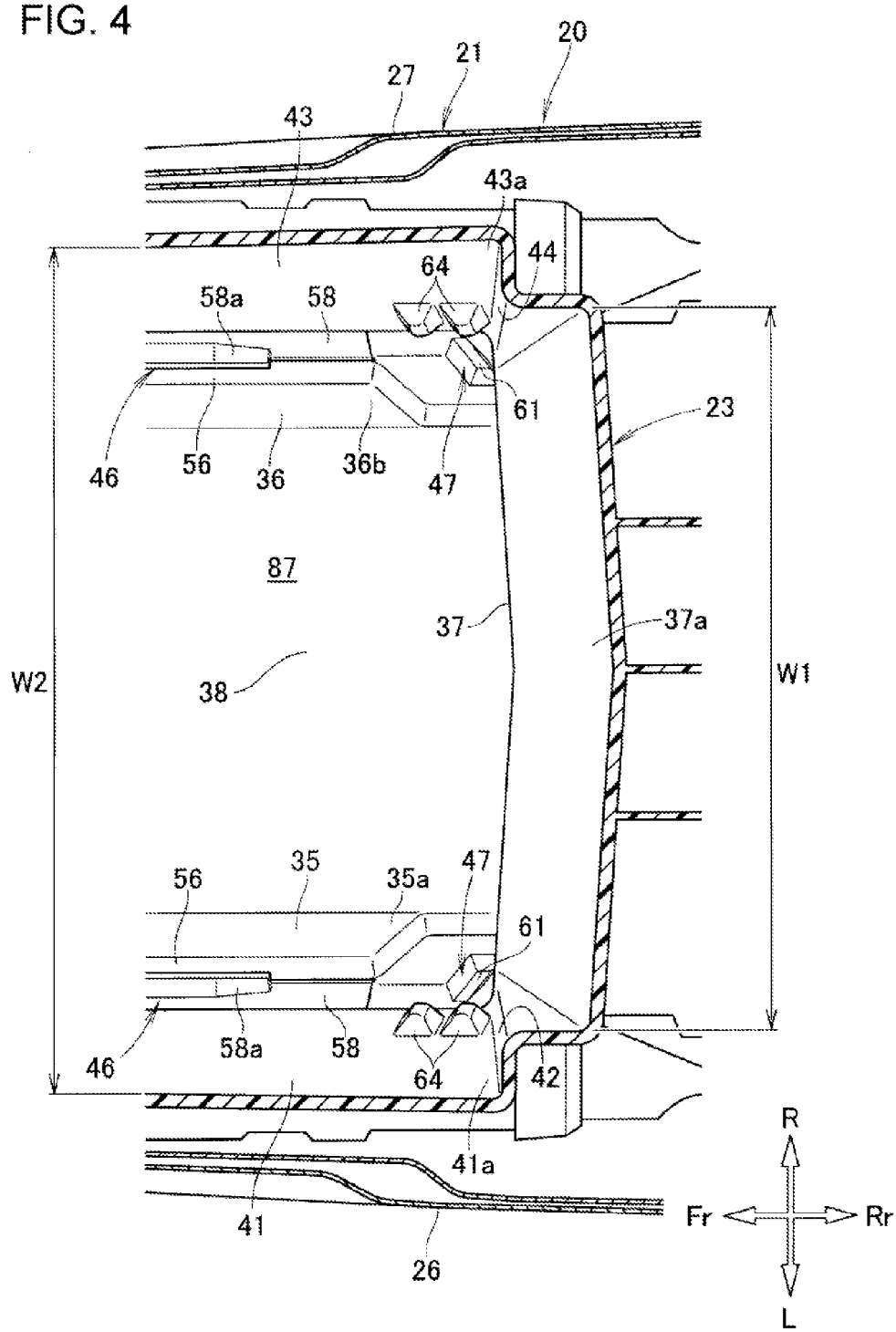
FIG. 4 is a sectional view taken along a line IV-IV in FIG. 2.

As illustrated in FIG. 4, the console left wall 35 includes an upward extending portion 41 formed in its rear half portion and extending upward, and a left stepped portion 42 connecting a rear end 41a of the upward extending portion 41 to an upper half portion 37a of the console rear wall 37. The console right wall 36 includes an upward extending portion 43 (see FIG. 3 as well) formed in its rear half portion and extending upward, and a right stepped portion 44 connecting a rear end 43a of the upward extending portion 43 to the upper half portion 37a of the console rear wall 37.

In other words, the left stepped portion 42 is formed at a left end of the upper half portion 37a of the console rear wall 37, and the right stepped portion 44 is formed at a right end of the upper half portion 37a of the console rear wall 37.

Returning to FIGS. 2 and 3, the upper half portion 37a of the console rear wall 37 is inclined at an upgrade toward the rear side of the vehicle. Hereinafter, the upper half portion 37a of the console rear wall 37 is called the "the upgrade rear wall 37a".

The upgrade rear wall 37a is positioned in an opposing relation to a tray vertical wall 67 (described later) of the tray 24 in a state where the tray 24 is arranged at a position in use (i.e., a state illustrated in FIG. 3).

As illustrated in FIG. 4, a width dimension W1 of the upgrade rear wall 37a taken in a widthwise direction of the vehicle is set to be smaller than a width dimension W2 between the console left wall 35 and the console right wall 36. Furthermore, the width dimension W1 of the upgrade rear wall 37a taken in the widthwise direction of the vehicle is set to be larger than a width dimension W3 (see FIG. 7) of the tray vertical wall 67 of the tray 24 and smaller than a width dimension W4 (see FIG. 7) of a tray body 66 (described later) of the tray 24.

The console left wall 35 is provided with a first tray support member 46 that horizontally extends from a front upper portion of the console left wall 35 to a position 35a near a rear end thereof, and a second tray support member 47 that vertically extends at a position nearer to the rear side of the vehicle than the first tray support member 46.

As illustrated in FIG. 4, the console right wall 36 is also provided with a first tray support member 46 that horizontally extends from a front upper portion 36a (see FIG. 3) of the console right wall 36 to a position 36b near a rear end thereof, and a second tray support member 47 that vertically extends at a position nearer to the rear side of the vehicle than the first tray support 46.

The first tray support member 46 and the second tray support member 47 of the console left wall 35 and the first tray support member 46 and the second tray support member 47 of the console right wall 36 are symmetric to each other in a left-and-right direction. In the following description, therefore, the support members on the left and right sides are denoted by the same reference signs for easier understanding of individual components.

Figure 5:
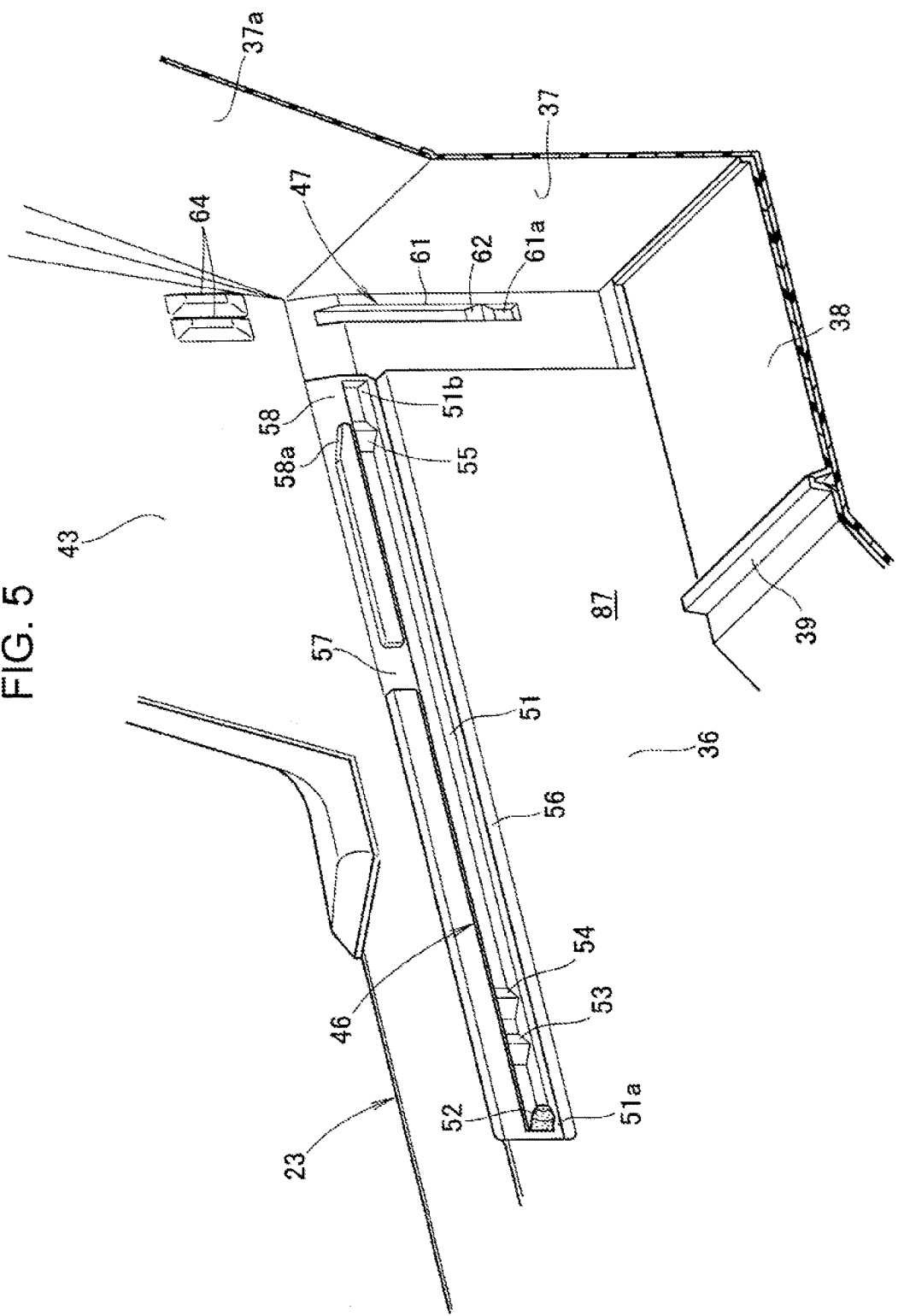
FIG. 5 is an enlarged view of a region V in FIG. 3.

As illustrated in FIGS. 2 and 5, the first tray support member 46 is formed such that, in the usable state, the tray 24 is supported to be movable in a longitudinal direction of the vehicle (i.e., a direction denoted by an arrow A).

In more detail, the first tray support member 46 includes a first guide rail 51 that horizontally extends from the front upper portion 36a of the console right wall 36 to the position 36b near the rear end thereof, a front biasing member 52 disposed at a front end 51a of the first guide rail 51, a first bump 53 formed rearward of the front biasing member 52 in the longitudinal direction of the vehicle, a second bump 54 formed rearward of the first bump 53 in the longitudinal direction of the vehicle, and a third bump 55 formed near a rear end 51b of the first guide rail 51.

The first guide rail 51 includes a support 56 formed under the first guide rail 51, a front taking-out recess 57 formed in a partly recessed shape substantially in an upper central region of the first guide rail 51, and a rear taking-out recess 58 formed in a partly recessed shape at a position upward and rearward of the third bump 55 in the longitudinal direction of the vehicle. A front side 58a of the rear taking-out recess 58 is formed so as to incline at an upgrade toward the front side of the vehicle.

The front biasing member 52 is formed of a resin or rubber material to be elastically deformable.

The second tray support member 47 is formed to be able to support the tray 24 in a stowed state.

In more detail, the second tray support member 47 includes a second guide rail 61 vertically extending at a position rearward of the first tray support member 46 in the longitudinal direction of the vehicle, a fourth bump 62 formed near a lower end 61a of the second guide rail 61, and a pair of upper guides 64 disposed at a position on an extension line 63 that extends upward from the second guide rail 61.

As with the console right wall 36, the console left wall 35 illustrated in FIG. 4 includes a first tray support member 46 and a second tray support member 47. Detailed description of the first tray support member 46 and the second tray support member 47 of the console left wall 35 is omitted.

As illustrated in FIGS. 3 and 4, the tray 24 is mounted to the first tray support member 46 of the console right wall 36 and the first tray support member 46 of the console left wall 35. The tray 24 is formed as a member substantially symmetric in the left-and-right direction. Accordingly, components on the left side of the tray 24 and components on the right side of the tray 24 are denoted by the same reference signs, and detailed description of the components on the right side is omitted.

Figure 6:
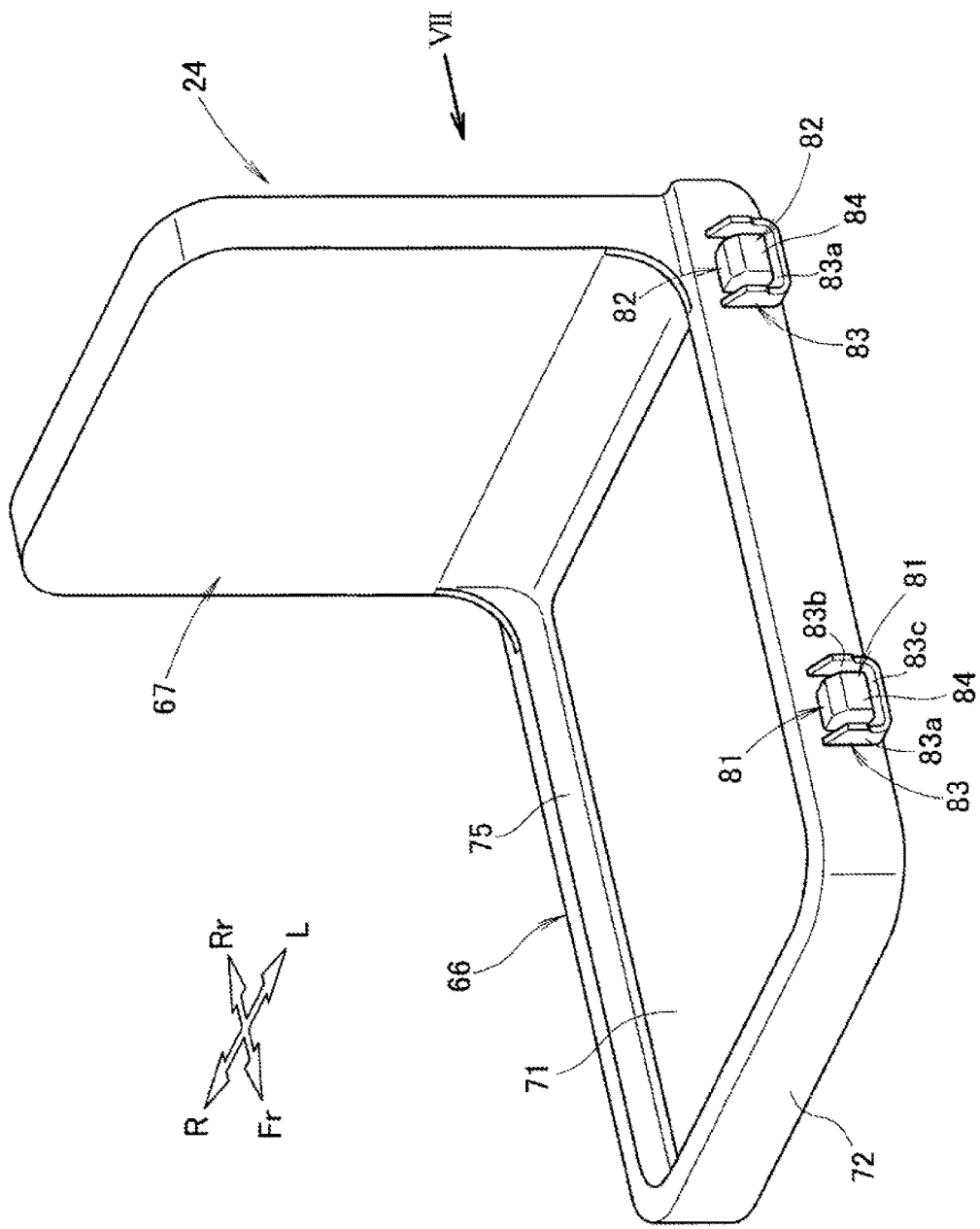
FIG. 6 is a perspective view of the tray illustrated in FIG. 3.
Figure 7:
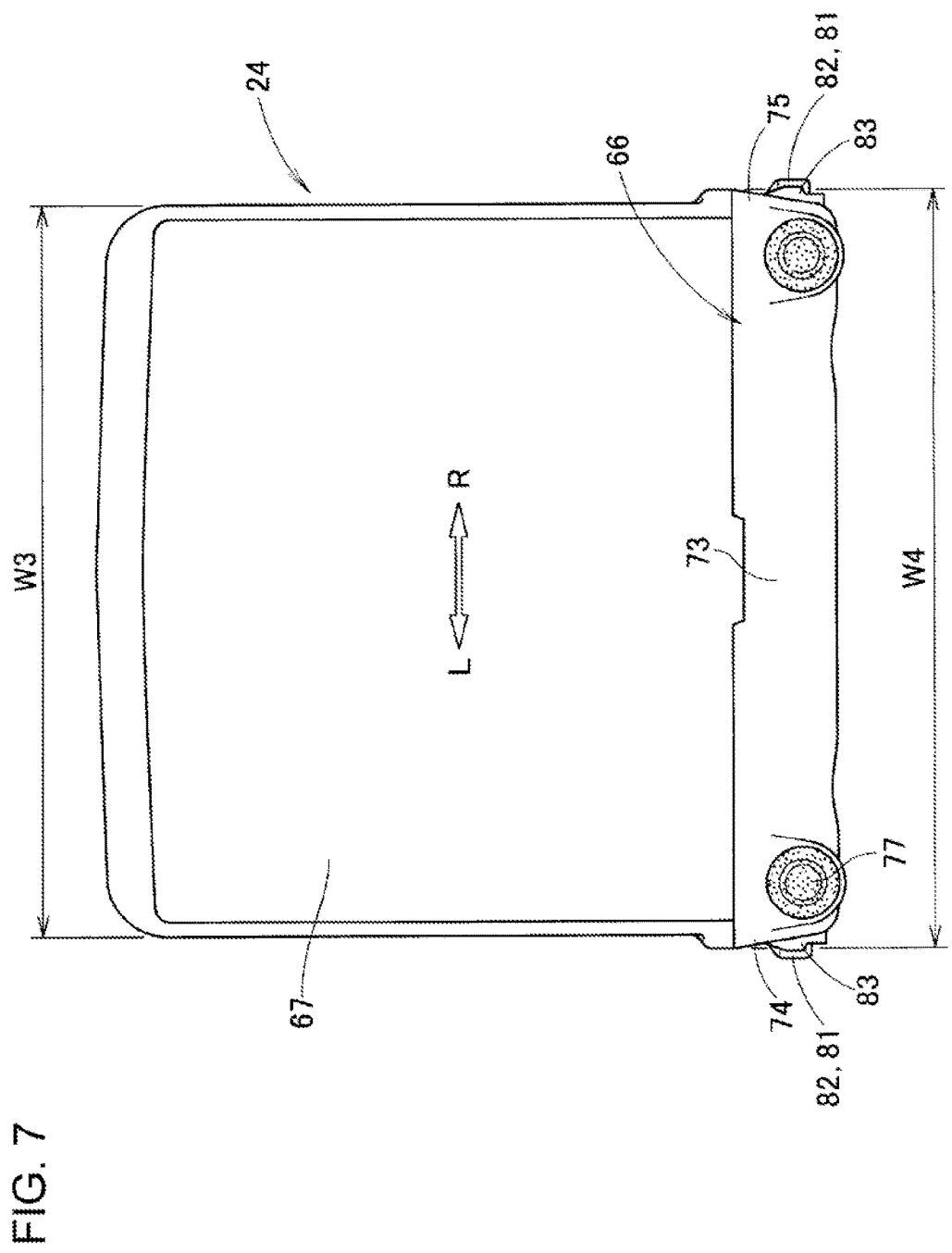
FIG. 7 is a view looking from a direction denoted by an arrow VII in FIG. 6.

As illustrated in FIGS. 6 and 7, the tray 24 includes a tray body 66 supported by both the first tray support member 46 on the left side and the first tray support member 46 on the right side, and a tray vertical wall 67 provided at a rear end of the tray body 66 in the longitudinal direction of the vehicle.

The tray body 66 has a tray bottom portion 71 formed in a substantially rectangular shape, a tray front wall 72 formed at a front end of the tray bottom portion 71, a tray rear wall 73 formed at a rear end of the tray bottom portion 71, a tray left wall 74 formed at a left side of the tray bottom portion 71, and a tray right wall 75 formed at a right side of the tray bottom portion 71.

The tray vertical wall 67 is raised upward from a rear portion (i.e., the tray rear wall 73) of the tray body 66 in the longitudinal direction of the vehicle. Thus, the tray 24 is formed in a substantially L-shape, when viewed from the side, by the tray body 66 and the tray vertical wall 67.

The tray vertical wall 67 is formed in a substantially rectangular shape when viewed from the rear. Moreover, the width dimension W3 of the tray vertical wall 67 is set to be smaller than the width dimension W4 of the tray body 66.

The tray 24 further includes a pair of first biasing members 77 (see FIG. 2 as well) that are disposed on the tray rear wall 73 at positions spaced from each other in a widthwise direction of the tray body 66. As with the front biasing member 52, each of the first biasing members 77 is formed of a resin or rubber material to be elastically deformable.

Figure 10:
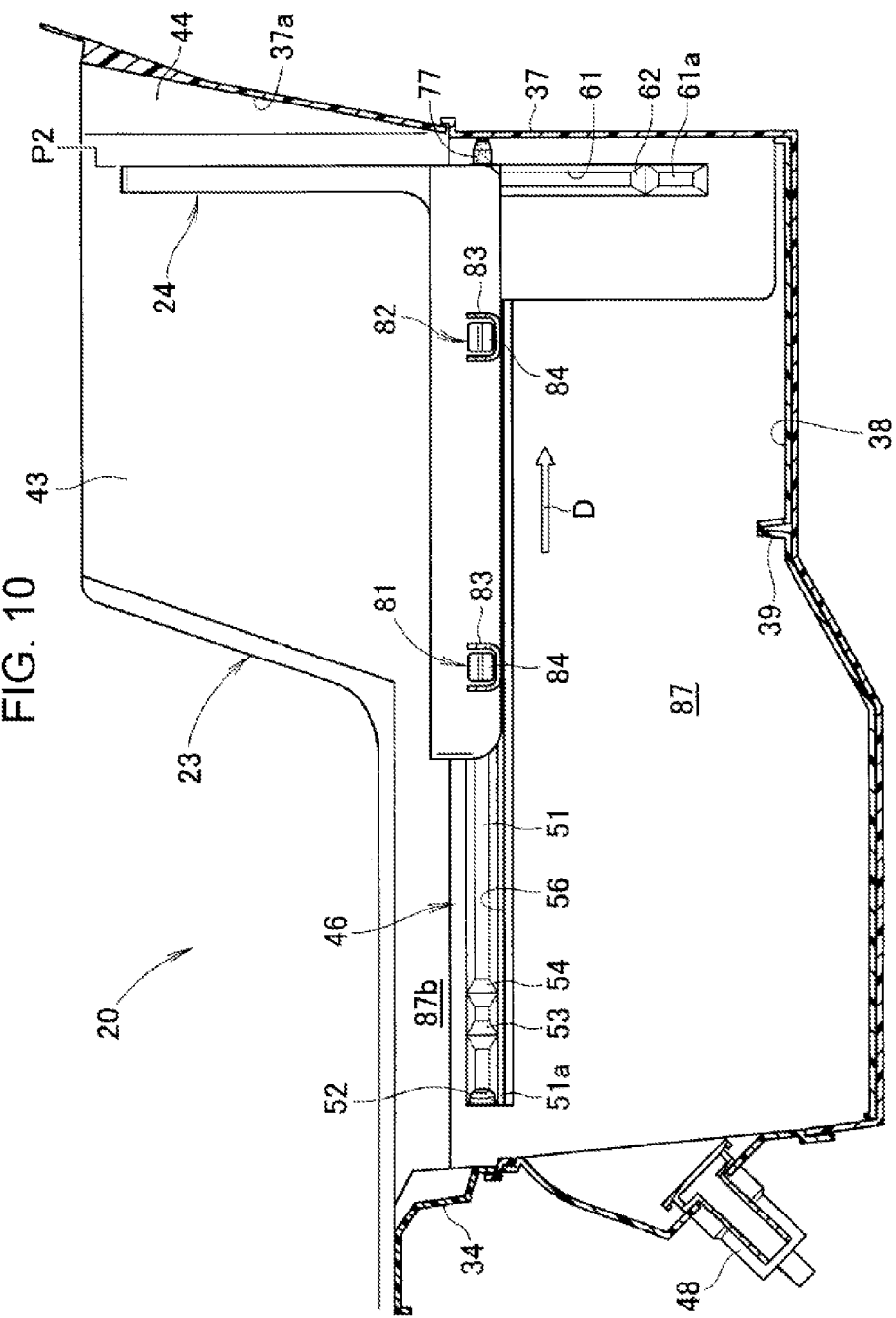
FIG. 10 is a sectional view illustrating a state where the tray illustrated in FIG. 2 is arranged at a rearward position of the console box in the longitudinal direction of the vehicle.

When the tray 24 is moved up to the rear end of the console box 23, the first biasing member 77 is abutted against the console rear wall 37 and is elastically deformed into a compressed state (see FIG. 10).

Furthermore, when the tray 24 is removed from the console box 23 (see FIG. 12B), the first biasing member 77 is pressed against the console rear wall 37 and is elastically deformed into the compressed state.

The tray 24 further includes a front second biasing member (second biasing member) 81 and a rear second biasing member (second biasing member) 82 that are disposed on the tray left wall 74 of the tray body 66 at positions spaced from each other in the longitudinal direction of the vehicle, and ribs 83 disposed respectively under the front and rear second biasing members 81 and 82.

In addition, the tray 24 includes a front second biasing member (second biasing member) 81 and a rear second biasing member (second biasing member) 82 that are disposed on the tray right wall 75 of the tray body 66 at positions spaced from each other in the longitudinal direction of the vehicle, and ribs 83 disposed respectively under the front and rear second biasing members 81 and 82.

Each of the ribs 83 has a rib front wall 83a, a rib rear wall 83b, and a rib bottom portion 83c. The rib bottom portion 83c is disposed just under each of the front second biasing member 81 and the rear second biasing member 82. The rib 83 is formed in a substantially U-shape, when viewed from the side, by the rib front wall 83a, the rib rear wall 83b, and the rib bottom portion 83c.

Figure 8:
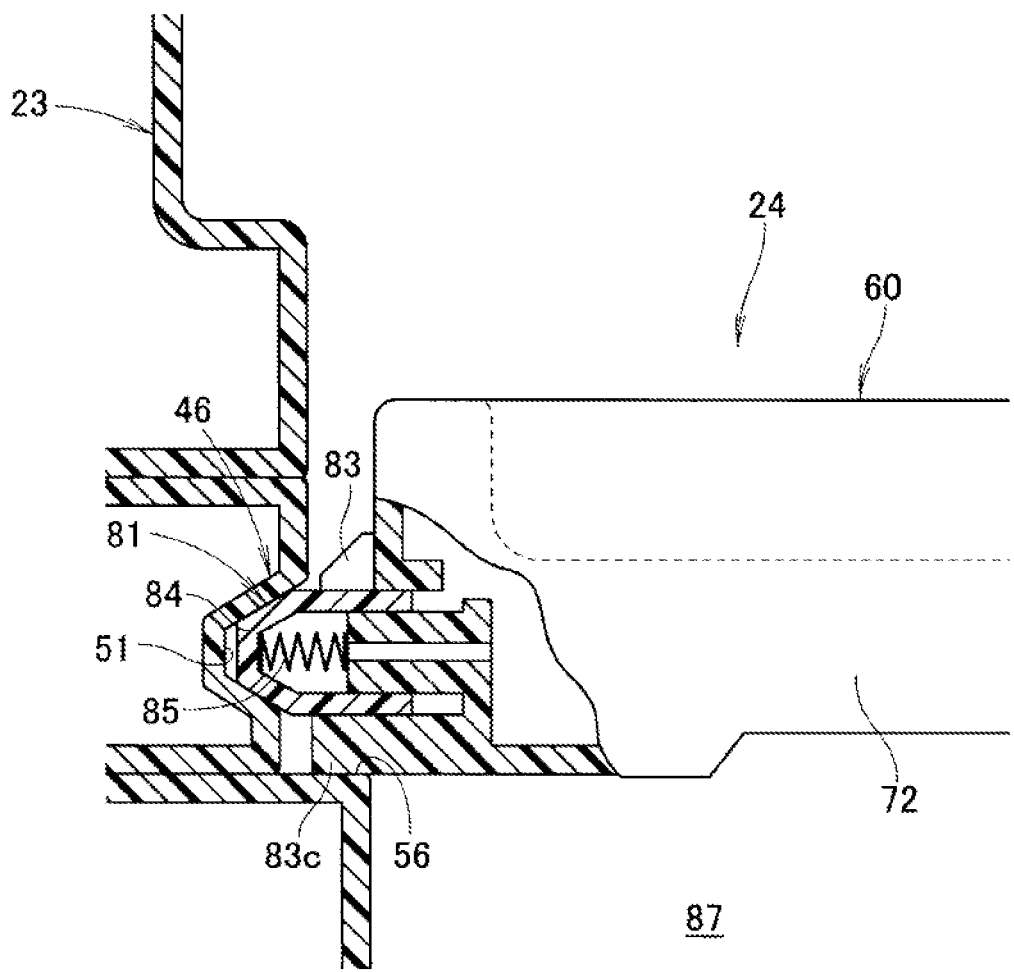
FIG. 8 is a sectional view taken along a line VIII-VIII in FIG. 2, the view illustrating a relation between a first tray support member on the right side and a front second biasing member on the right side.

As illustrated in FIGS. 2 and 8, the front second biasing member 81 on the right side includes a projection 84 that is supported on the tray right wall 75 in a freely projecting and retracting manner, and a spring 85 biasing the projection 84 outward in the widthwise direction of the tray body 66. The projection 84 is pressed against the first guide rail 51 on the right side by a biasing force of the spring 85. Thus, the projection 84 is supported by the first guide rail 51 on the right side to be movable in the longitudinal direction of the vehicle.

Moreover, in the above state, the rib bottom portion 83c of the rib 83 on the right side is supported by the support 56 in a state contacting therewith and being movable in the longitudinal direction of the vehicle.

As a result, the tray body 66 is supported by the first guide rail 51 on the right side and the support 56 on the right side to be movable in the longitudinal direction of the vehicle (i.e., the direction denoted by the arrow A).

Furthermore, since the projection 84 is pressed against the first guide rail 51 on the right side, it is possible to suppress "wobbling" (particularly in the widthwise direction of the vehicle) of the tray 24 arranged in the usable state, and hence to suppress the occurrence of unusual sounds and vibrations.

In addition, since the rib bottom portion 83c of the rib 83 on the right side is supported by the support 56 in a state contacting therewith and being movable in the longitudinal direction of the vehicle, the tray 24 can be avoided from disengaging and dropping into the console box 23 with the presence of the rib 83 even when a heavy article is placed on the tray body 66.

A state where the tray 24 is mounted into the usable state within the console box 23 and is arranged at a forward position P1 of the console box 23 in the longitudinal direction of the vehicle will be described below with reference to FIGS. 3 and 9.

Figure 9:
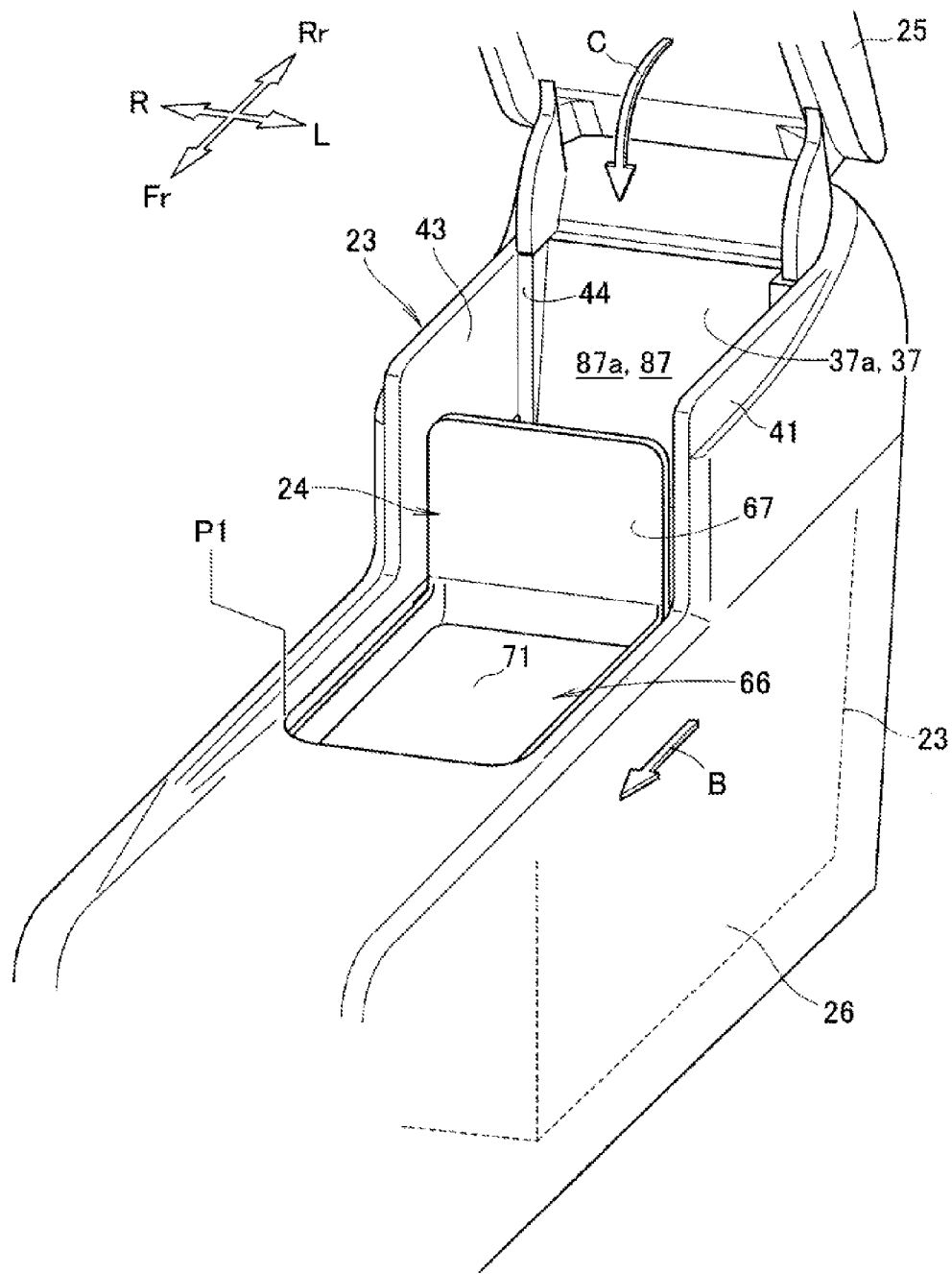
FIG. 9 is a perspective view illustrating a state where the tray illustrated in FIG. 2 is arranged at a forward position of the console box in a longitudinal direction of the vehicle.

As illustrated in FIGS. 3 and 9, the tray 24 is moved, as denoted by an arrow B, toward the forward position P1 of the console box 23 in the longitudinal direction of the vehicle. The projection 84 (see FIG. 8) of the front second biasing member 81 hits the first bump 53. The spring 85 (see FIG. 8) of the front second biasing member 81 is compressed to such an extent that the projection 84 rides over the first bump 53. Thus, the projection 84 is positioned forward of the first bump 53 in the longitudinal direction of the vehicle, and the tray 24 is held at the forward position P1 of the console box 23 in the longitudinal direction of the vehicle.

In the above state, an upper space 87a in a rear half portion of a box interior 87 is opened, and the tray front wall 72 of the tray body 66 is abutted against the front biasing member 52. With the abutment of the front biasing member 52 against the tray front wall 72, the front biasing member 52 is elastically deformed into a compressed state. Accordingly, it is possible to suppress "wobbling" of the tray 24 arranged at the forward position P1 of the console box 23 in the longitudinal direction of the vehicle, and hence to suppress the occurrence of unusual sounds and vibrations.

When the tray 24 is supported in the usable state within the console box 23 as described above, the tray vertical wall 67 extends upward from the tray rear wall 73 of the tray body 66. With the presence of the tray vertical wall 67, therefore, small articles placed on the tray body 66 can be avoided from moving to the outside. As a result, a possibility that the small articles (such as a mobile terminal) placed on the tray body 66 may drop into the interior 87 of the console box 23 (the interior being also called the box interior 87) can be reduced.

Furthermore, since the tray vertical wall 67 is formed to extend upward from the tray rear wall 73, the upper space 87a in the rear half portion of the box interior 87 can be partitioned by the tray vertical wall 67 (see FIG. 2 as well). Accordingly, for example, when the armrest 25 is opened and a tall article (such as a plastic bottle) is stored in the box interior 87 through the upper space 87a in the rear half portion of the box interior 87, the tall article can be held in contact with the tray vertical wall 67. As a result, the tall article can be stored in the box interior 87 in a stable state.

Moreover, since the tray vertical wall 67 is formed to extend upward from the tray rear wall 73, articles stored in the box interior 87 can be concealed from the outside with the presence of the tray vertical wall 67.

In particular, when the armrest 25 is closed as denoted by an arrow C, the articles stored in the box interior 87 can be more satisfactorily concealed from the outside with the presence of the tray vertical wall 67.

As a result, the articles stored in the box interior 87 can be made harder to be seen from the outside, and this point is preferable from the viewpoint of security.

Additionally, in the state where the tray 24 is held at the forward position P1 of the console box 23 in the longitudinal direction of the vehicle, the tray 24 is positioned with a spacing S1 (see FIG. 2) formed relative to the console front wall 34. Accordingly, for example, in the case of charging a mobile terminal placed on the tray body 66 of the tray 24, a harness (cord) of the mobile terminal can be connected to the accessory power supply (ACC) 48 through the spacing S1.

A state where the tray 24 is arranged at an intermediate position P4 of the console box 23 will be described below with reference to FIGS. 2 and 3.

Returning to FIGS. 2 and 3, the projection 84 of the front second biasing member 81 is positioned between the first bump 53 and the second bump 54. In that state, the tray 24 is arranged at the intermediate position P4 of the console box 23.

Accordingly, the tray 24 is arranged with a larger spacing than the spacing S1 formed relative to the console front wall 34. Thus, for example, a harness (cord) being too thick to pass through the spacing S1 can be led through the larger spacing.

A state where the tray 24 is arranged at the rearward position P2 of the console box 23 in the longitudinal direction of the vehicle will be described below with reference to FIGS. 10 and 11.

Figure 11:
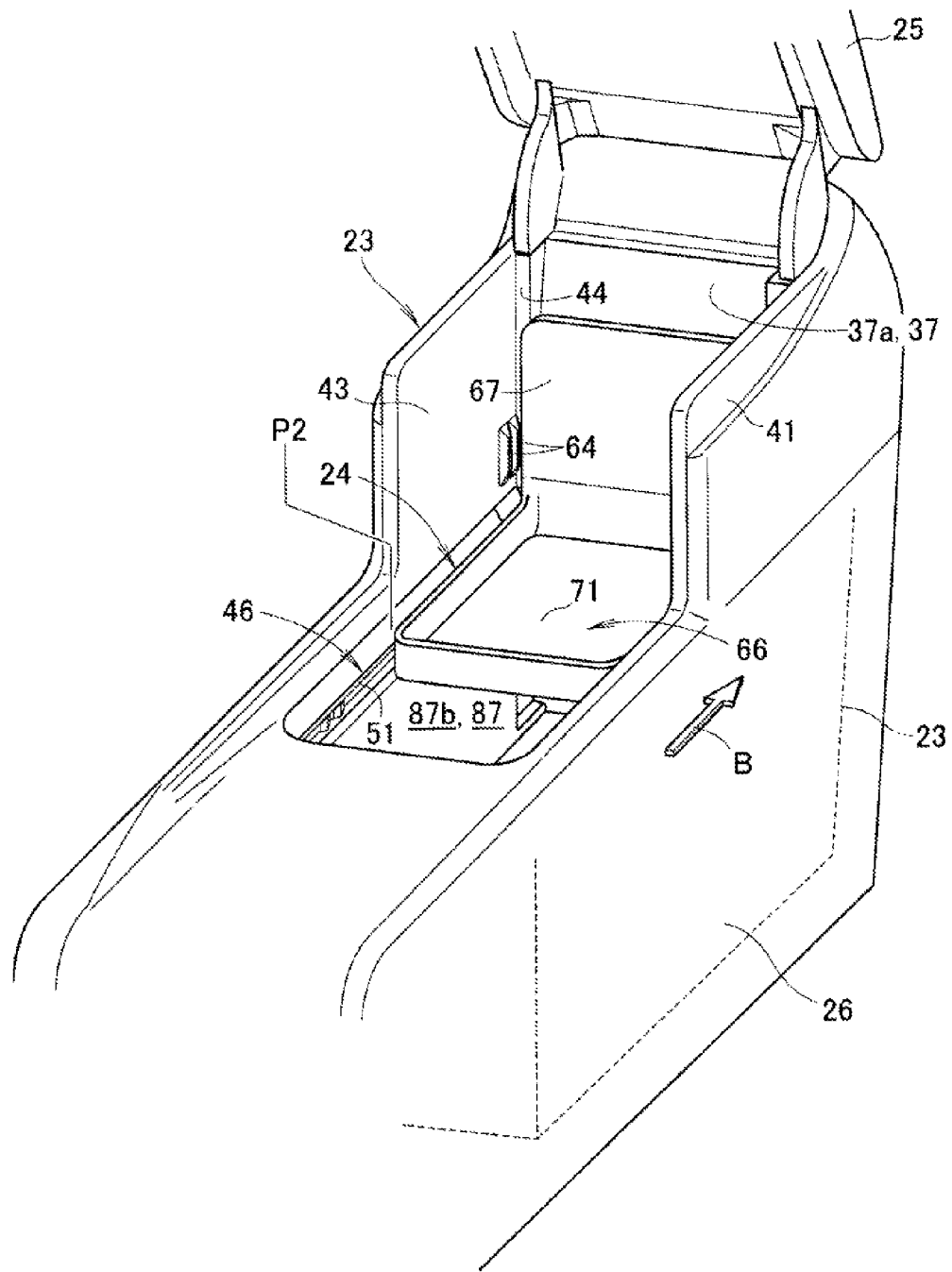
FIG. 11 is a perspective view illustrating the state where the tray is arranged, as illustrated in FIG. 10, at the rearward position of the console box in the longitudinal direction of the vehicle.

As illustrated in FIGS. 10 and 11, when the tray 24 is moved, as denoted by an arrow D, toward the rear side of the console box 23 in the longitudinal direction of the vehicle, the projection 84 of the rear second biasing member 82 hits the third bump 55 (see FIG. 5). The spring 85 (see FIG. 8) of the rear second biasing member 82 is compressed to such an extent that the projection 84 rides over the third bump 55. Thus, the projection 84 is positioned rearward of the third bump 55 in the longitudinal direction of the vehicle, and the tray 24 is held at the rearward position P2 of the console box 23 in the longitudinal direction of the vehicle.

In the above state, the first biasing member 77 of the tray body 66 is pressed against the console rear wall 37. The first biasing member 77 is elastically deformed into a compressed state with the pressing against the console rear wall 37. Accordingly, it is possible to suppress "wobbling" of the tray 24 arranged at the rearward position P2 of the console box 23 in the longitudinal direction of the vehicle, and hence to suppress the occurrence of unusual sounds and vibrations.

Furthermore, since the tray 24 is held at the rearward position P2 of the console box 23 in the longitudinal direction of the vehicle, an upper space 87b in a front half portion of the box interior 87 is opened. Hence a tall article (such as a plastic bottle) can be placed into the box interior 87 through the upper space 87b in the front half portion thereof.

An example of removing the tray 24 from the console box 23 will be described below with reference to FIGS. 12A, 12B, and 13.

Figure 12A:
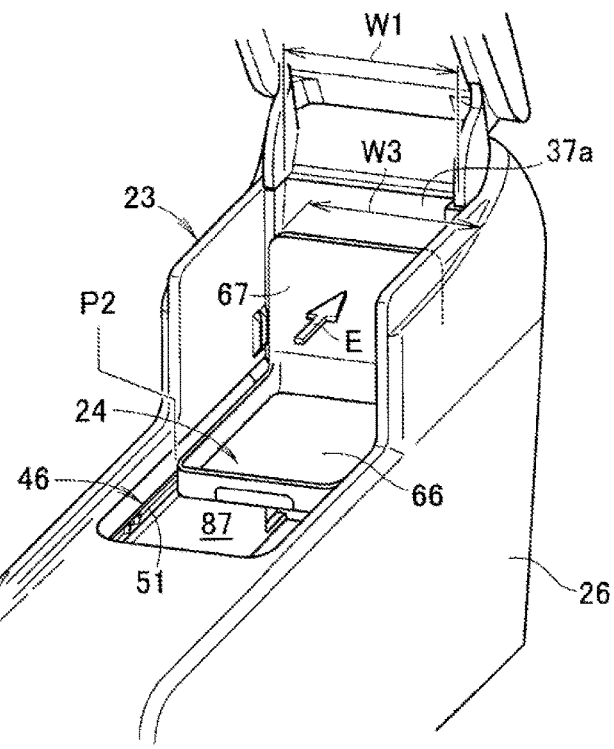
FIGS. 12A and 12B are explanatory views referenced to explain an example of dismounting the tray of the vehicular console device according to the present application in an upward direction from the first guide rail.

As illustrated in FIG. 12A, the tray 24 is arranged at the rearward position P2 of the console box 23 in the longitudinal direction of the vehicle. In a state where the tray 24 is arranged at the rearward position P2 of the console box 23 in the longitudinal direction of the vehicle, the tray vertical wall 67 of the tray 24 is moved toward the upgrade rear wall 37a as denoted by an arrow E.

Here, the width dimension W1 of the upgrade rear wall 37a is set to be larger than the width dimension W3 of the tray vertical wall 67.

Figure 12B:
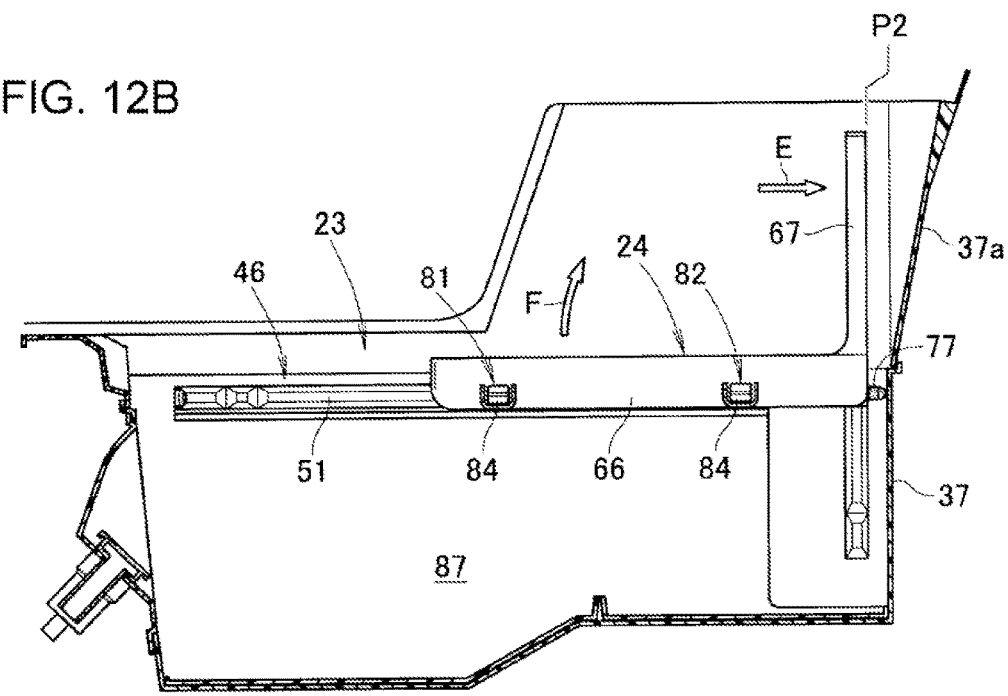

As illustrated in FIG. 12B, the pair of first biasing members 77 is abutted against the console rear wall 37 and is elastically deformed into a compressed state. Here, the front second biasing member 81 is positioned under the front taking-out recess 57 (see FIG. 5). Furthermore, the rear second biasing member 82 is positioned under the rear taking-out recess 58 (see FIG. 5).

By pressing the tray vertical wall 67 of the tray 24 against the upgrade rear wall 37a in the above state as denoted by the arrow E, the tray vertical wall 67 is inclined along the upgrade rear wall 37a.

Accordingly, the tray body 66 is lifted upward, as denoted by an arrow F, with the pair of first biasing members 77 serving as pivot points. With the lifting of the tray body 66, the front second biasing member 81 is easily displaced upward from the first guide rail 51 through the front taking-out recess 57. Furthermore, the rear second biasing member 82 is easily displaced upward from the first guide rail 51 through the rear taking-out recess 58.

Figure 13:
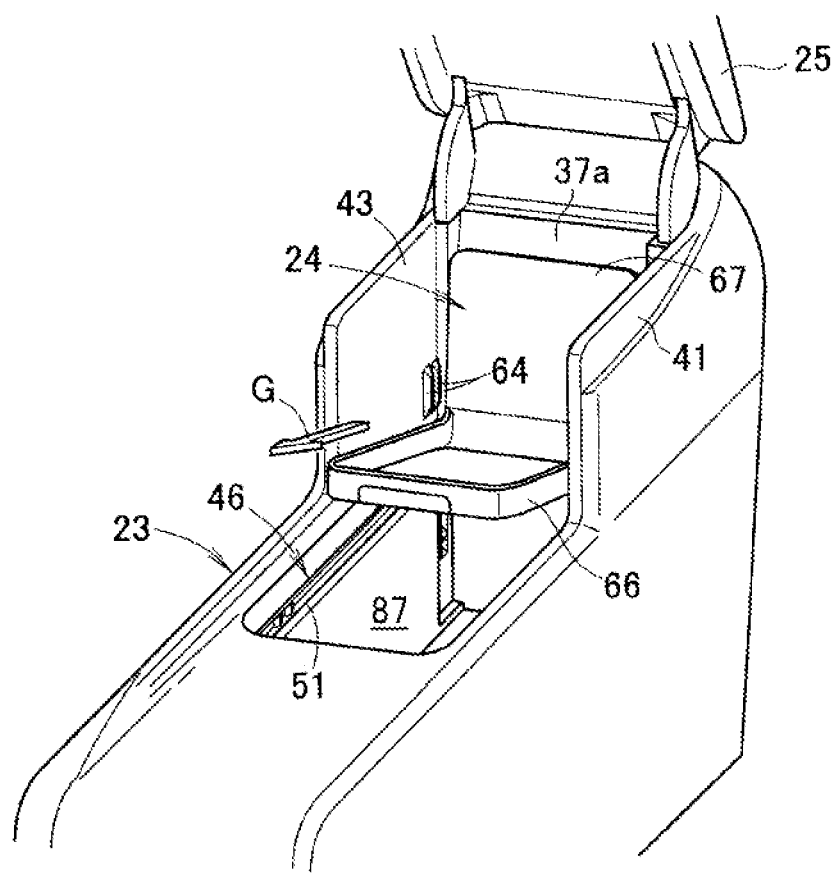
FIG. 13 is an explanatory view referenced to explain an example of removing the tray according to the present application from the console box.

As illustrated in FIG. 13, the tray body 66 is disengaged from the first guide rail 51 and is lifted above the first guide rail 51. From such a state, the tray 24 is removed from the console box 23 as denoted by an arrow G.

Thus, the tray 24 can be easily removed from the console box 23 by inclining the tray vertical wall 67 along the upgrade rear wall 37a, and by lifting the tray body 66 upward.

An example of stowing the tray 24 into the console box 23 will be described below with reference to FIGS. 14A, 14B, 15A and 15B.

Figure 14A:
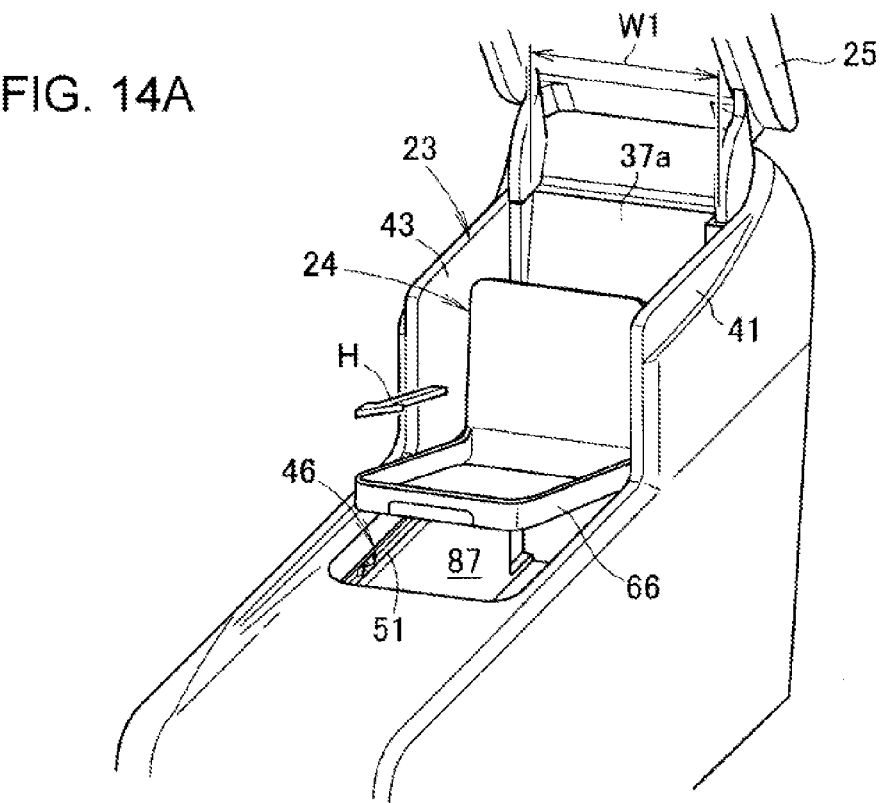
FIGS. 14A and 14B are explanatory views referenced to explain an example of stowing the tray according to the present application into the console box.

As illustrated in FIG. 14A, the tray body 66 is disengaged from the first guide rail 51. By lifting the tray body 66 above the first guide rail 51 in the above state as denoted by an arrow H, the tray 24 is removed from the console box 23.

Figure 14B:
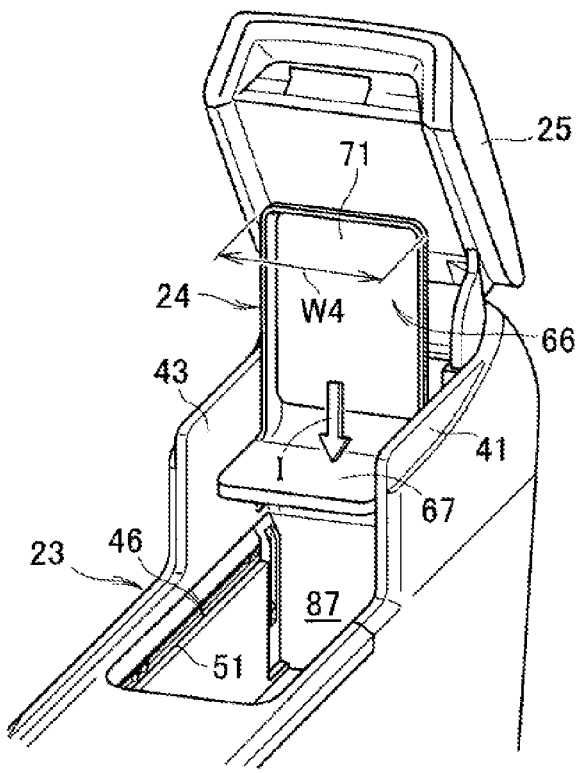

As illustrated in FIG. 14B, the tray 24 removed from the console box 23 is oriented such that the tray body 66 is positioned on the upper side and the tray vertical wall 67 is positioned on the lower side. While keeping the tray 24 in such a state, the tray bottom portion 71 of the tray body 66 (specifically, a bottom surface of the tray bottom portion 71) is contacted with both the left stepped portion 42 (see FIG. 4) of the console left wall 35 and the right stepped portion 44 (see FIG. 4) of the console right wall 36.

Here, the width dimension W1 of the upgrade rear wall 37a is set to be smaller than the width dimension W4 of the tray body 66. Therefore, the tray body 66 can be prevented from contacting with and inclining along the upgrade rear wall 37a. Hence the bottom surface of the tray bottom portion 71 can be positively contacted with both the left stepped portion 42 and the right stepped portion 44.

As a result, the tray body 66 can be easily arranged in a vertical posture. In a state where the tray body 66 is arranged in the vertical posture, the tray 24 is moved downward as denoted by an arrow I.

Figure 15A:
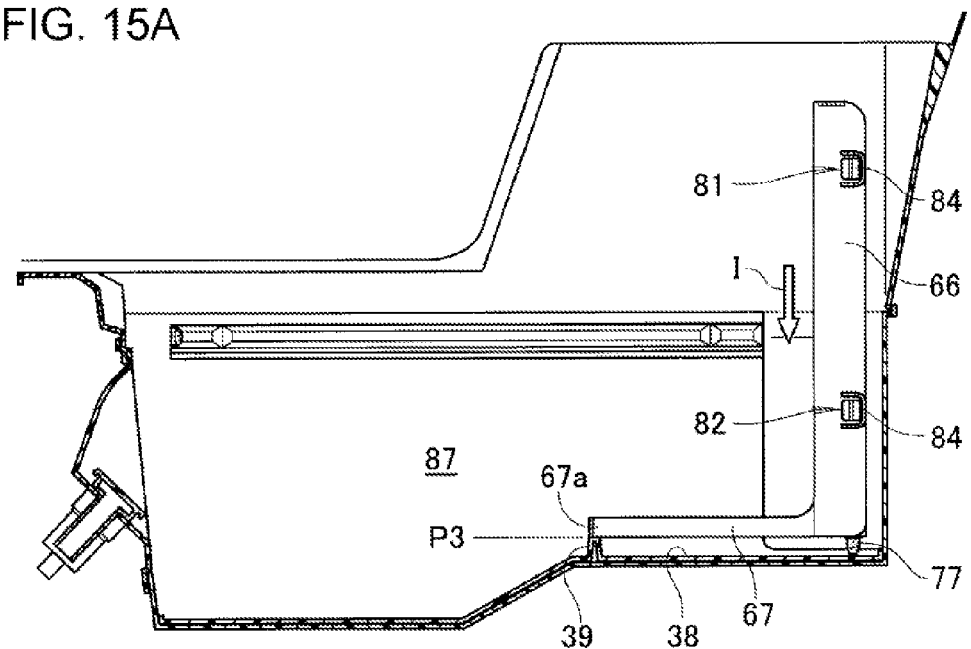
FIGS. 15A and 15B are explanatory views referenced to explain a state where the tray according to the present application is stowed in the console box.

As illustrated in FIG. 15A, the projection 84 of the rear second biasing member 82 is inserted to the second guide rail 61 (see FIG. 5) of the second tray support member 47.

Moreover, the projection 84 of the front second biasing member 81 is inserted between the pair of upper guides 64 (see FIG. 5) of the second tray support member 47.

With the tray 24 further moved downward as denoted by the arrow I, the projection 84 of the rear second biasing member 82 hits the fourth bump 62 (see FIG. 5).

The spring 85 (see FIG. 8) of the rear second biasing member 82 is compressed to such an extent that the projection 84 rides over the fourth bump 62. Thus, the projection 84 is positioned under the fourth bump 62, and the pair of first biasing members 77 is contacted with the console bottom portion 38.

Furthermore, an upper end 67a of the tray vertical wall 67 is contacted with the protrusion 39 on the console bottom portion 38. Accordingly, the tray 24 is held at a stowed position P3 in the console box 23.

In the above state, the first biasing members 77 are pressed against the console bottom portion 38. Accordingly, it is possible to suppress "wobbling" of the tray 24 arranged at the stowed position P3 in the console box 23, and hence to suppress the occurrence of unusual sounds and vibrations.

Moreover, in the state where the tray 24 is held at the stowed position P3 in the console box 23, the tray body 66 is positioned to extend along the console rear wall 37. In addition, the tray vertical wall 67 is positioned to extend along the console bottom portion 38. Thus, the box interior 87 of the console box 23 is not partitioned by the tray 24. As a result, the box interior 87 can be utilized as a large space.

Figure 15B:
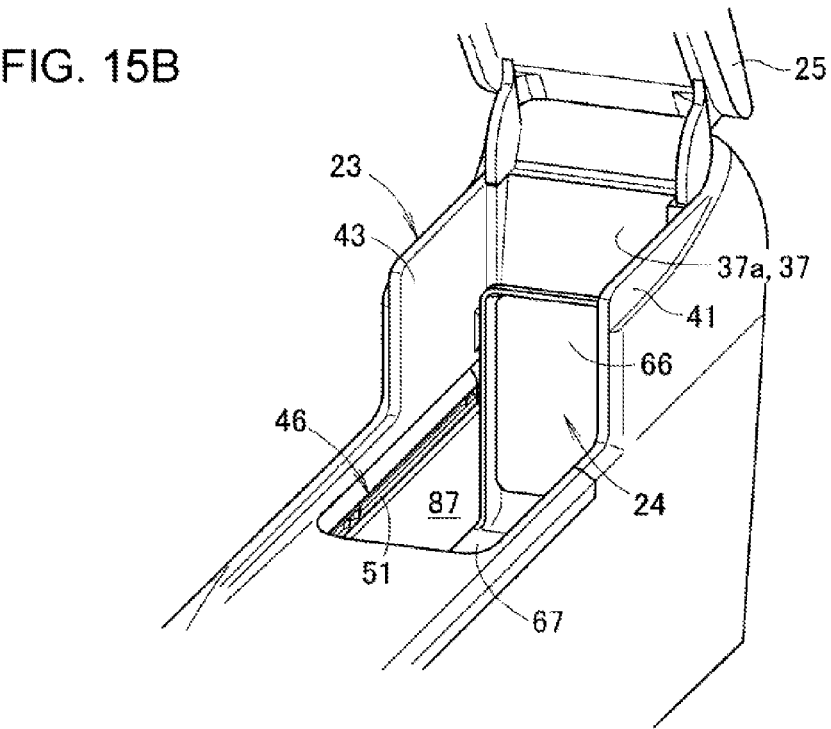

As illustrated in FIG. 15B, the armrest 25 is supported above the rear half portion of the box interior 87 in a freely opening and closing manner. Accordingly, by lifting the armrest 25 upward so as to open the upper space in the rear half portion of the box interior 87, a comparatively large-sized article can be stored in the box interior 87 that is formed as a large space.

An example of mounting the tray 24 into the usable state within the console box 23 will be described below with reference to FIGS. 16A and 16B.

Figure 16A:
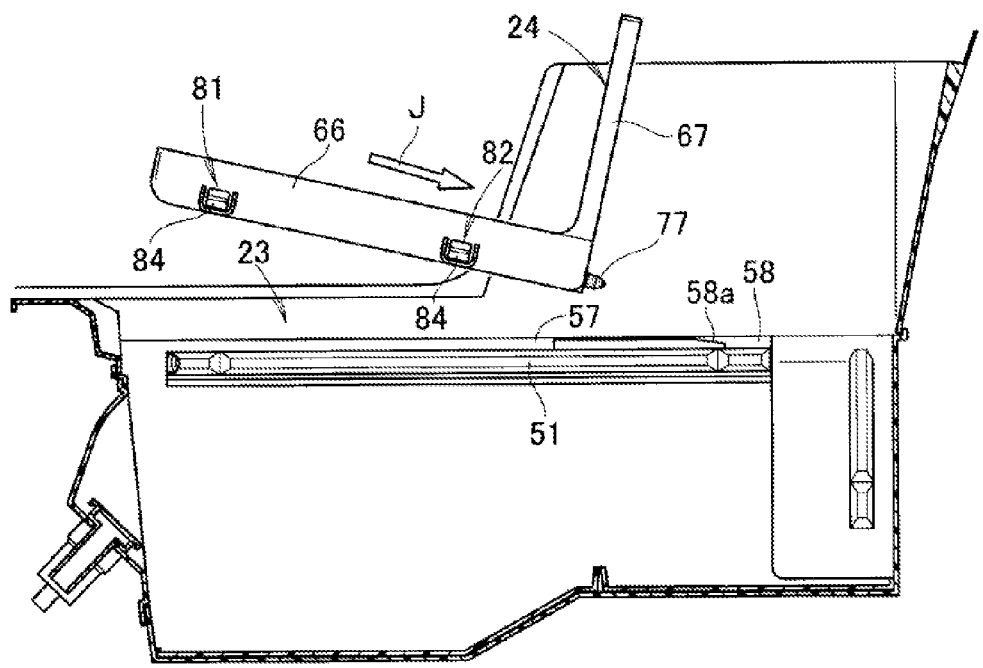
FIGS. 16A and 16B are explanatory views referenced to explain an example of mounting the tray according to the present application in the console box for setting into a state for use.

As illustrated in FIG. 16A, the tray 24 held in an inclined state is moved, as denoted by an arrow J, toward the rear taking-out recess 58 from above the console box 23.

Here, the front side 58a of the rear taking-out recess 58 is formed so as to incline at an upgrade toward the front side of the vehicle. Thus, the rear second biasing member 82 of the tray 24 is moved toward the first guide rail 51 along the front side 58a of the rear taking-out recess 58. As a result, the rear second biasing member 82 can be easily engaged with the first guide rail 51.

After engaging the rear second biasing member 82 with the first guide rail 51, the front second biasing member 81 is engaged with the first guide rail 51 through the front taking-out recess 57.

Figure 16B:
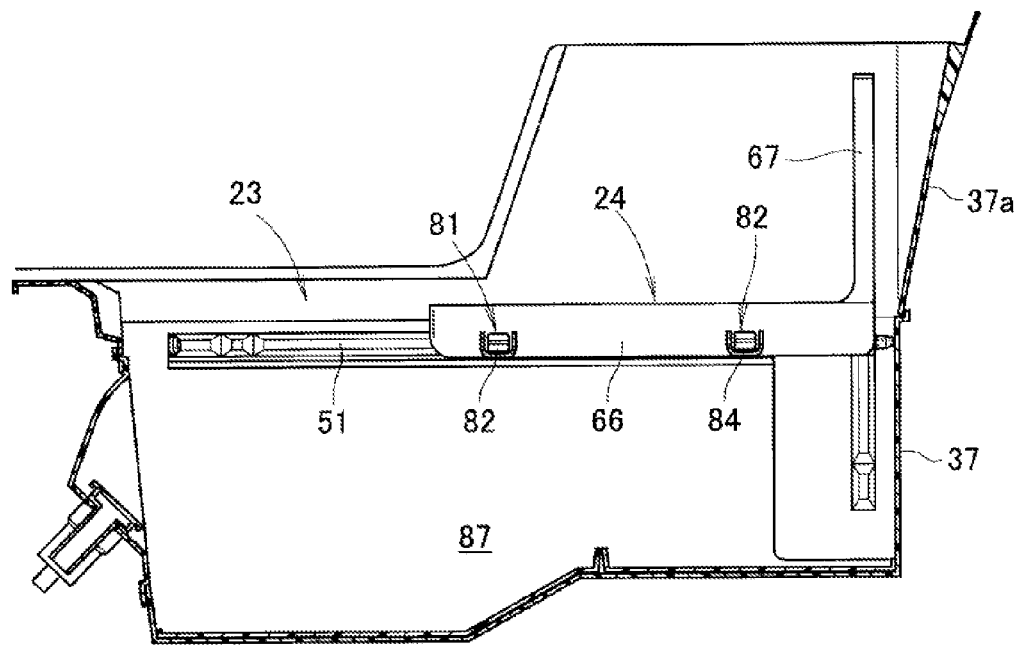

Thus, as illustrated in FIG. 16B, the rear second biasing member 82 is engaged with the first guide rail 51, and the front second biasing member 81 is also engaged with the first guide rail 51. As a result, the tray 24 can be mounted into the usable state within the console box 23.

The vehicle console device according to the present application is not limited to the above-described embodiment, and it can be modified and improved as appropriate.

While the above embodiment has been described, by way of example, in connection with the case where the rib bottom portion 83c of the front second biasing member 81 is contacted with the support 56, the present application is not limited to the illustrated embodiment. As another example, the projection 84 may be pressed against the first guide rail 51 such that the tray 24 is supported by the first tray support member 46 in a way of keeping the rib bottom portion 83c not contacted with the support 56.

In addition, respective shapes and configurations of the vehicle, the console device, the console outer casing, the console box, the tray, the console rear wall, the upgrade rear wall, the console bottom portion, the tray body, the tray vertical wall, the tray rear wall, the tray left wall, the tray right wall, the front and rear second biasing members, the rib, etc., which are described in the above embodiment, are not limited to the illustrated ones, and they can be modified as appropriate.

The present application can be suitably applied to an automobile including a vehicular console device, which includes a console box disposed in a vehicle interior and a tray supported in the console box.

What is claimed is:

1. A vehicular console device comprising:
    a console box disposed in a vehicle interior; and
    a tray supported in the console box,
    wherein the tray comprises:
        a tray body configured to be supported in the console box to be movable in a front-to-rear direction of a vehicle; and
        a tray vertical wall extending upward from a rear portion of the tray body in the front-to-rear direction of the vehicle,
    the tray is detachable from the console box and is attachable to the console box such that the tray is supported by the console box in a usable state in which the tray is usable as a tray or in a stowed state in which the tray is housed within the console box, and
    in the stowed state, the tray is held in the console box in a state in which the tray body is positioned to extend along a console rear wall of the console box and the tray vertical wall is positioned to extend along a console bottom portion of the console box.

2. The vehicular console device according to claim 1, wherein the console rear wall of the console box comprises an upper half portion opposing to the tray vertical wall, the upper half portion being an inclined wall toward a rear side of the vehicle.

3. The vehicular console device according to claim 1, wherein the tray is configured to be movable to a position adjacent to the console rear wall, and the tray has a first biasing member that is disposed in a rear end of the tray body and that is abutted against the console rear wall when the tray is moved to the position adjacent to the console rear wall.

4. The vehicular console device according to claim 1, wherein the tray has:
    a second biasing member that is disposed in a side portion of the tray body in a manner that biases the console box against the console box; and
    a rib disposed in the side portion of the tray body underneath the second biasing member to support the tray.

5. The vehicular console device according to claim 2, wherein the console box further comprises stepped portions at respective side ends of the inclined wall, which are not inclined, each of the stepped portions protruding toward a front side of the vehicle, a distance between the side ends of the inclined wall being equal to or larger than a width of the tray vertical wall.

6. The vehicular console device according to claim 1, wherein the tray has a tray front wall and tray side walls, upper ends of the tray front wall and the tray side walls having the same height as one another, but being lower than an upper end of the tray vertical wall.

\* \* \* \* \*